United States Patent [19]

Lyon et al.

[11] 4,271,117
[45] Jun. 2, 1981

[54] ROTATIONAL MOLDING OF CYLINDRICAL OBJECTS HAVING SWIRLED TEXTURED OUTER SURFACES

[76] Inventors: Fred K. Lyon, 4507 New Hope Ave., Pascagoula, Miss. 39567; Ralph E. Lyon, Rte. 3, Box 463, Laurel, Miss. 39440

[21] Appl. No.: 933,839

[22] Filed: Aug. 15, 1978

[51] Int. Cl.³ .............................................. B29C 5/04
[52] U.S. Cl. .................................. 264/275; 264/297; 264/298; 264/311
[58] Field of Search ............... 264/298, 311, 310, 270, 264/73, 297, 275

[56] References Cited

U.S. PATENT DOCUMENTS

| | | | |
|---|---|---|---|
| 669,119 | 5/1901 | Krank | 264/298 |
| 3,094,375 | 6/1963 | Halford | 264/298 |
| 3,770,865 | 11/1973 | Ralles | 264/298 |
| 3,894,136 | 7/1975 | Waddill | 264/298 |

Primary Examiner—James B. Lowe
Attorney, Agent, or Firm—LeBlanc, Nolan, Shur & Nies

[57] ABSTRACT

A method for molding a container or similar article to produce a texturized outer surface defining random decorative swirls is disclosed. The method includes injecting liquid material to be molded, such as hot wax, into a rotating cylindrical mold. The molding surface is provided by a liquid, such as water, which has a greater specific gravity than the material to be molded. The rotating mold causes the liquid molding surface to be formed by centrifugal force. The material to be molded, in molten form, is poured into the mold and is maintained in intimate contact with the molding surface by centrifugal force until solidification. The molded article then takes the external texture of the liquid surface, reflecting the viscosity of the liquid, and the centrifugal forces exerted thereon. The method also includes smaller articles within larger articles and molding articles stacked on each other within the rotating mold.

13 Claims, 12 Drawing Figures

ROTATIONAL MOLDING OF CYLINDRICAL OBJECTS HAVING SWIRLED TEXTURED OUTER SURFACES

This invention relates to an improved molding process, and in particular to a process for producing a molded article having a unique texturized outer surface. The process of this invention includes the step of injecting a molten wax or similar material into a rotating mold having vertical surfaces covered with a liquid held thereagainst by centrifugal forces. The wax then coats the rotating liquid surface, solidifies, and assumes the texture thereof. Articles then may be successively molded within a single rotating container by injecting the liquid molding surface into the container after the previously injected molten wax has solidified. The liquid will then coat the solidified wax inner surface thereby providing a new molding surface for a successive injection of molten wax. The articles formed then would be of decreasing diameters.

In a similar fashion, the process of this invention may be adapted to simultaneously mold stacks of said articles successively within a single rotating container. Each stack would be separated by a plate.

It is known in the art to mold articles in a rotating mold. For example, in U.S. Pat. No. 3,976,821, a process is described for molding particles of a polymer by heating a rotating mold containing said polymers. Centrifugal force causes the particles to be spread along the mold surface so that when the mold is cooled, the article will be formed.

It is also known in the art to cast pellets by injecting molten droplets into a rotating mold containing water or another liquid cooling agent. Various processes for forming pellets in this fashion are described in U.S. Pat. Nos. 3,329,746; 1,782,038; 3,887,692; 2,439,772; and 2,994,102.

In these last mentioned patents, the processes described utilize the water filled rotating mold as a quenching agent, primarily, whereby a molten droplet of material, having a different specific gravity than that of the water, will form spherical pellets when quenched. Accordingly, it is an essential element of said disclosures that the molten material must be submerged within the cooling liquid.

It has been discovered however that when the molten material injected into a rotating mold having liquid therein has a lesser specific gravity than the liquid, the material may be molded against the outer surface of the liquid to take the configuration of said surface. In this fashion, according to the process of this invention, when the rotating mold contains a liquid which by centrifugal force merely coats the inner surface thereof, a cylindrical object may be molded against the surface of said liquid by centrifugal force.

As the molten material is introduced into the mold, centrifugal force causes it to flow against the molding fluid. As the volume of material increases, it is forced to climb the surface of the spinning molding fluid and eventually cover it to a desired thickness. The very surface part of the material in contact with the fluid, which is at a desired temperature, is immediately cooled to its plastic or pliable state. The combined controllable actions of centrifugal force, material composition, viscosity of the material, its temperature, fluid temperature and viscosity, method and rate of introduction, etc. cause the texture to form. However, some of these variables within the process are related. The viscosity of the wax blend is related to the type and amount of additives it contains as well as its temperature. Centrifugal forces within the mold are determined by the speed of rotation (RPM's), and the diameter at the molding surface. For a given set of circumstances definite surface texture pattern catagories may be obtained and duplicated.

The molded article then will cool against the liquid surface and take a unique texturized swirling pattern surface configuration. The cylindrical article then may be utilized for forming a candle, container, or the like having the aforedescribed unique surface configuration.

Accordingly, it is an object of this invention to provide a process for molding articles against a liquid surface in a rotating mold to provide a unique surface configuration therefore.

It is another object of this invention to provide a method for molding a cylindrical wax article in a rotating mold whereby the article will have a unique swirling surface configuration.

It is yet another object of this invention to provide a method for molding candles or candle shells from molten wax whereby said wax is injected into a rotating mold containing a liquid molding surface whereby said wax will solidify against the liquid surface through the action of centrifugal force. It is yet another object of this invention to provide a method for sequentially molding a plurality of articles in a common rotating mold, each article being molded against a liquid surface.

It is still another object of this invention to provide a method for molding both stacks and a plurality of articles simultaneously within a mold wherein each article is formed against a liquid surface, taking the outer configuration of said surface including the swirling texture thereof.

It is still another object of this invention to provide a method for molding candle shells or decorative objects in glass containers having an opening too small to permit removal of the molded object.

These and other objects will become readily apparent with reference to the drawings and following description wherein.

Figure 1:
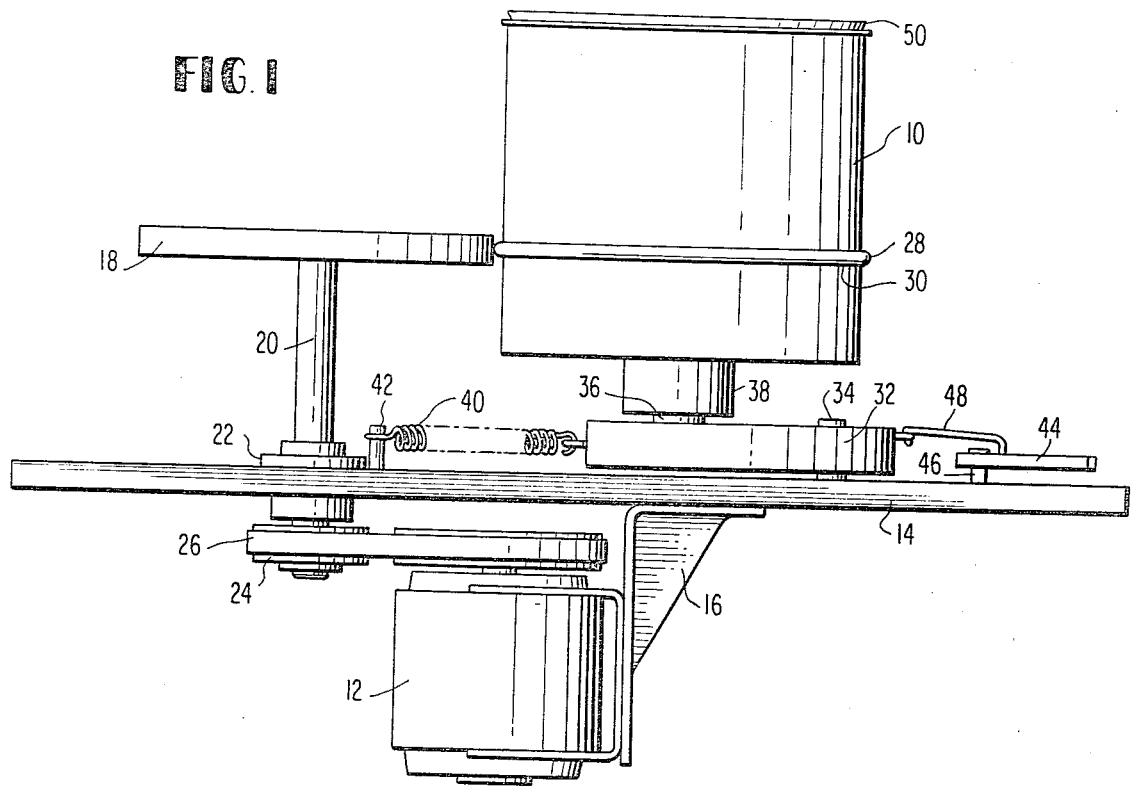
FIG. 1 is a front view of a molding device for the process of this invention.
Figure 2:
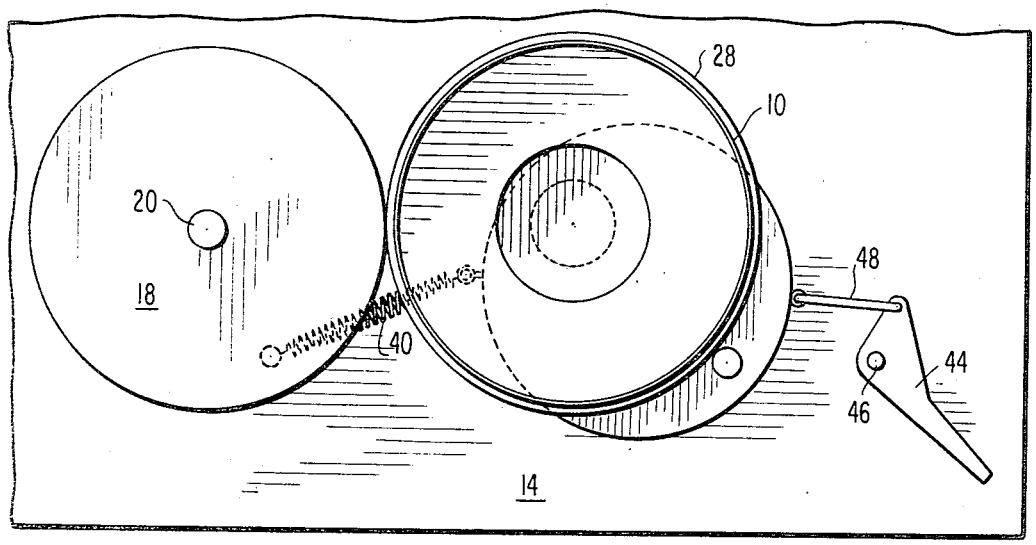
FIG. 2 is a fragmentary plan view of the device of FIG. 1 showing the clutching action for engaging the drive mechanism.
Figure 3:
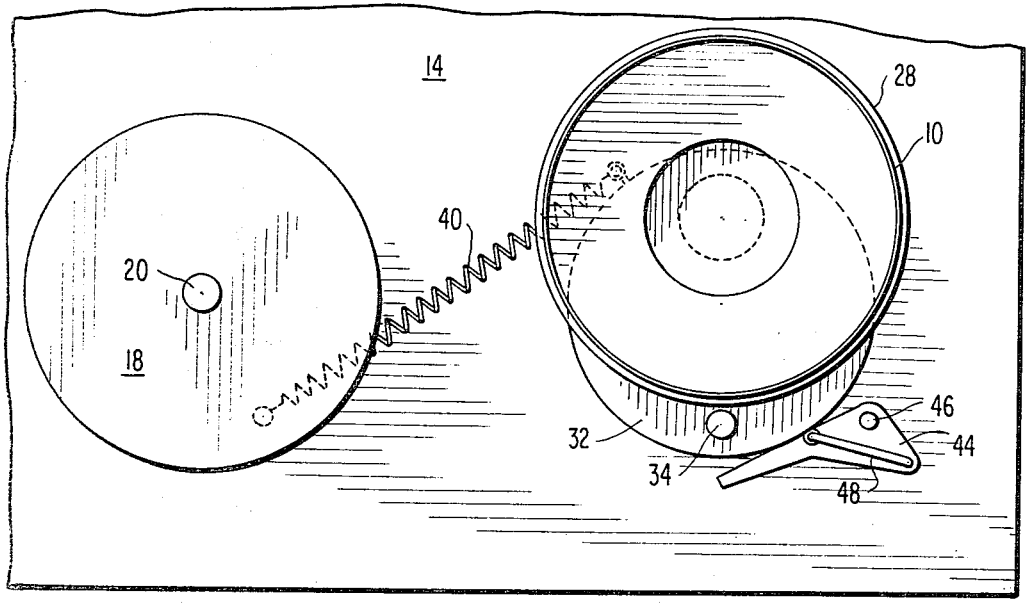
FIG. 3 is a view similar to FIG. 2 showing the drive mechanism disengaged.

With reference to FIGS. 1–3, a preferred machine for the process of this invention is described as follows:

The means for causing the mold container 10 to rotate is preferably an electric motor 12. The motor 12 may be mounted on a stationary table 14 by a suitable bracket 16. A drive wheel 18, which is merely a round metal disc, is mounted on a shaft 20 which in turn is supported by a thrust bearing 22. Shaft 20 extends through table 14 and terminates in a pulley wheel 24 which is driven by motor 12 through a conventional V-belt 26. The mold container 10 mounts an O-ring 28 circumferentially, which ring preferably fits in a groove 30. Accordingly, as motor 12 causes shaft 20 and disc 18 to rotate, that rotation is translated to mold container 10 by frictional engagement between O-ring 28 and drive wheel 18.

As is well known in the art, the speed of rotation of tank 10 may be controlled by, for example, utilizing a commercially available, "brush-type" direct current motor with controlled speed and torque as motor 12. In the alternative, a variable speed pulley (not shown) may be utilized such as that described and claimed in U.S. Pat. No. 2,952,161.

Tank 10 is pivotally mounted on table 14. The mounting plate 32 is pivotally mounted on table 14 by a pin 34. The bottom surface of tank 10 and plate 32 are interconnected by a bolt 35 with a recessed nut 36, and a bearing 38 is also provided.

A spring 40 connects plate 32 and a stationary pin 42 mounted on table 14. Spring 40 normally urges tank 10 against drive wheel 18.

A clutching mechanism is provided by lever 44. Lever 44 is rotatably attached to table 14 by a pin 46. Lever 44 is also connected to plate 32 by a link 48. As shown in FIG. 2, spring 40 normally urges container 10 and O-ring 28 against drive wheel 18. However, when cam lever 44 is rotated about pin 46 to the position shown in FIG. 3, plate 32 is caused to rotate about pin 34, drawing tank 10 away from drive wheel 18 whereby wheel 18 will be free to spin without turning tank 10.

Figure 4:
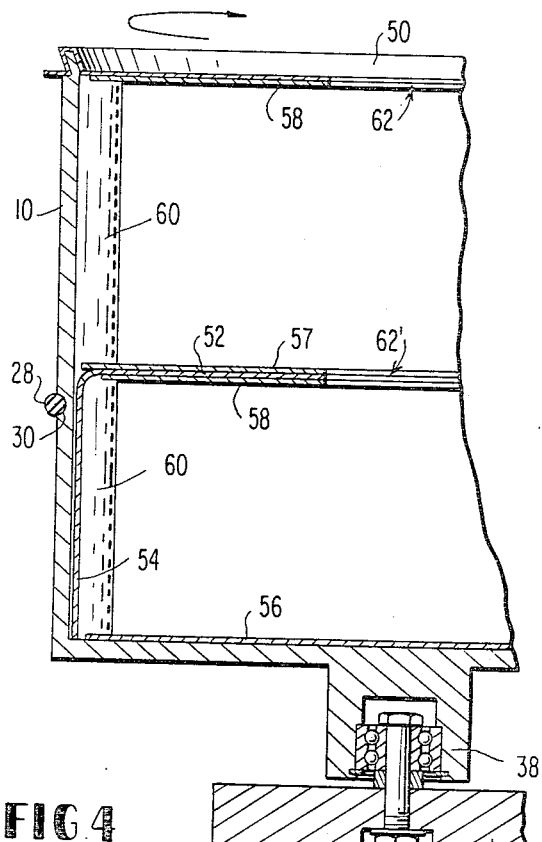
FIG. 4 is a fragmentary cross-sectional view of an embodiment of the apparatus of FIG. 1.

With attention to FIG. 4, the tank 10 is machined to take a water tight lid 50. The water tight lid is made preferably of a flexible plastic. The flexible lid functions as follows:

Centrifugal force within tank 10 causes the water therein to assume a hollow cylindrical shape. The water tight lid on the mold tank prevents the water from being forced out of the tank by centrifugal force. This contained hollow column of water however exerts force on the underside of the lid. This force causes the lid to assume a slightly convex shape, when viewed from outside the mold tank. So long as the RPM's of the tank, and the amount of water in the tank are neither increased nor decreased. The inside diameter of the column and the position assumed by the lid remain fairly constant. However, as the wax is introduced into the mold it displaces a certain amount of water. This displaced water exerts additional force on the underside of the lid and causes the lid to assume a more pronounced convex shape. As this amount of wax cools it shrinks vertically and circumferentially. The elastic properties of the lid then aid in returning the previously displaced water back down into the mold tank, thus assuring that the water and the lid remain in contact with the wax article. The lid holds the article down and prevents a premature release.

Tank 10 also may be provided with an intermediate plate 52. Plate 52 is suspended at a desired height within tank 10 by legs 54. A metal disc 56 is disposd on the bottom of tank 10, and a similar disc 57 rests on support plate 52.

The metal disc 56 or 57 has a surface texture that allows a slight adherence of the wax article to it. This texture may be a roughened surface of the metal disc, or a suitable applied coating to the disc. Both methods are acceptable. As the wax is deposited on the metal disc and contacts the liquid surface, it is immediately cooled to its plastic or pliable state. A slight adherence to the disc is required to hold this cooled wax down in the mold tank. If the article is not immediately adhered to the disc, that portion that was first textured by the liquid will be forced up in the tank as the volume of the deposit increases. This rise then creates an objectionable appearance at the bottom of the article. The metal disc 56 or 57 with particles of wax that were adhered during the molding of the articles is removed for cleaning, thus virtually eliminating the clean up of the mold tank 10.

The underside of lid 50, and the underside of plate 52 mounts preferably a paper ring saturated with the molding liquid 58.

The paper ring described is attached to the lid to prevent the wax from adhering to the lid, thus eliminating clean up problems and increasing the useful life of the lid.

Figure 4A:
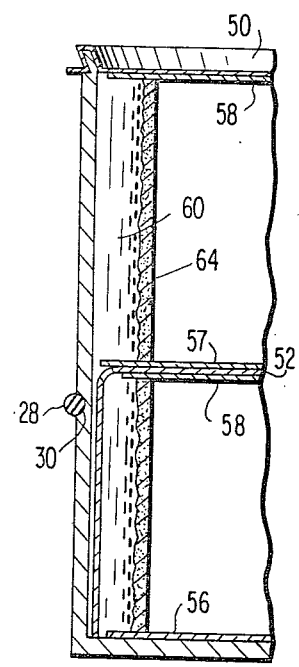
FIG. 4A is a fragmentary view of the apparatus of FIG. 4 illustrating the molding of stacked articles.
Figure 4B:
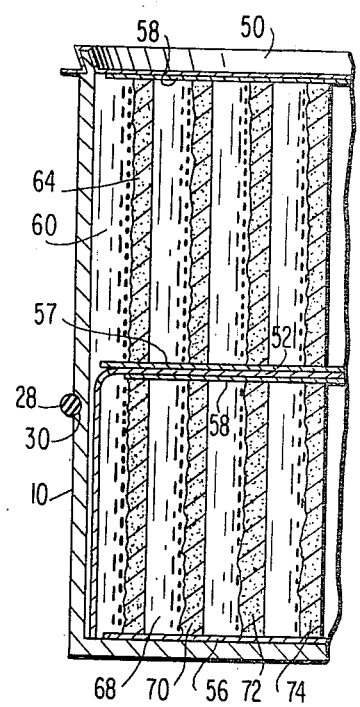
FIG. 4B is a fragmentary view similar to FIG. 4 illustrating the stacked articles of FIG. 4A with additional articles being sequentially formed.

It should be emphasized however that plate 52 and supporting projections 54 are not required unless stacked articles are to be molded as shown in FIGS. 4A and 4B.

In a preferred embodiment of this invention, the interior vertical wall of tank 10 is coated with water 60 by rotation of tank 10, and the centrifugal forces associated therewith.

The internal surface configuration of the mold tank 10 can be used to cause definite flow patterns within the molding fluid. A tank which is threaded for a spiral lift of fluid would cause a downward flow of fluid at the molding surface. A thread for a downward thrust would cause a lifting flow of fluid at the molding surface. These and other flow patterns can affect the dispersment of the wax over the molding surface.

The material to be molded in a preferred embodiment is a Chevron 133/135 AMP candle wax obtainable from Standard Oil Company of California, located at San Francisco, Calif. Another material may be a DuPont Elvax No. 210, obtainable from E. I. DuPont Company of Wilmington, Del. In addition, Microcrystaline Wax may be utilized, also obtainable from DuPont, or from the Gulf Oil Company of Houston, Tex. The preferred material to be molded is a mixture of the three. Chevron 133/135 AMP has a melting point of 134° F. and a viscosity of 3.7 cSt at 210° F. Elvax 210 is an ethylene/-vinyl acetate copolymer having an inherent viscosity at 30° C. (0.25 g/100 ml. toluene) of 0.54. This copolymer ranges from 27.2 to 28.8 percent vinyl acetate.

The microcrystaline wax from Gulf, Gulf Microcrystaline Wax 75, has a melting point of 173.5° F. and a molecular weight of 746.

The material to be molded is preferably poured into tank 10 through a hole 62 in lid 50. Centrifugal force causes the molten material to be drawn against the wall so that the molten material to be molded 64 coats the mold surface 60. If plate 52 is utilized, a similar hole is provided 62' therethrough so that the material to be molded may be poured onto plate 56 also. After one coating 64 has solidified, additional water may be added through holes 62 and 62' to form a second molding surface 68. Molten material to be molded is then added again through holes 62 and 62' to form a coating 70 thereon. Successively then, articles may be molded within the container to form cylinders disposed in a stacked relationship on plates 57 and 56. Each molded article then has a peculiar outside textural surface corresponding to the swirls in the water surface which it was molded against.

Figure 5:
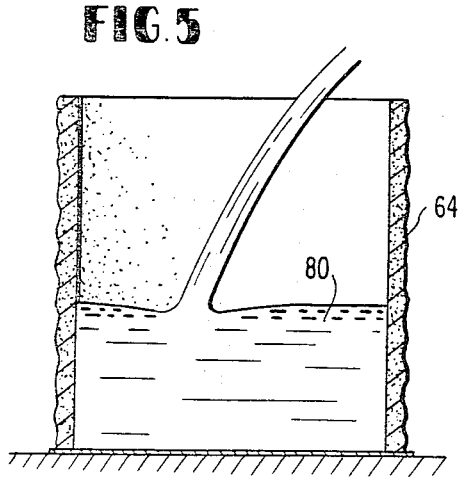
FIG. 5 is a cross-sectional view of a molded article according to the process of this invention being formed into a candle.
Figure 6:
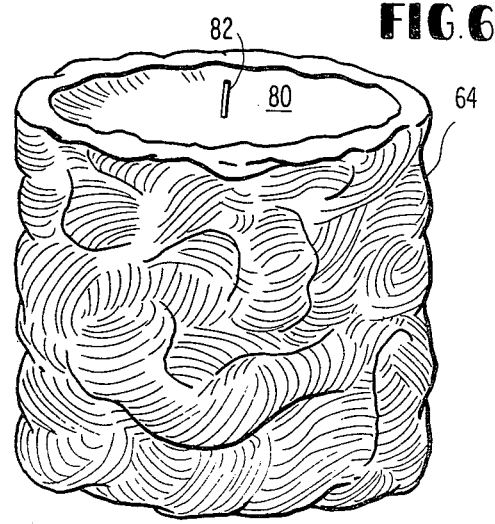
FIG. 6 is a perspective view of a candle formed according to the process of this invention.

Once the interior shell of the molded article 64, 70, 72, and 74 have cooled, they are removed from tank 10 and placed in a vat of water at room temperature. After 10 to 15 minutes, the shell may be removed from the vat, allowed to dry, and as shown in FIGS. 5 and 6, the shell 64 may be filled with molten candle wax 80 and a wick 82 to form a candle having a very unique outside texture. In the alternative, a flat base may be attached to the shell to form a container, pencil holder, planter, or the like.

Figure 7:
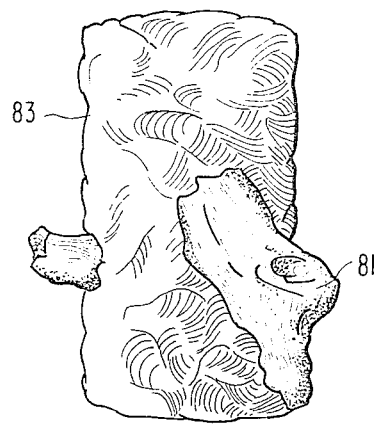
FIG. 7 is a perspective view of a decorative object formed according to process of this invention.

With reference to FIG. 7, decorative articles may also be incorporated in the molded shell. If the article is other material having a specific gravity of less than water, it should be weighted with sufficient lead weights to overcome its buoyancy. As shown in FIG. 7, driftwood may be placed on the disc 56, weighted, and a candle shell molded therearound in accordance with the above described procedure. When removed from the tank 10, after cooling, the driftwood 81 will be formed integral with the candle shell 83. As will be obvious to those skilled in the art, sea shells, or any other type of decorative material may also be incorporated in a shell of wax molded according to the process of this invention.

Figure 8:
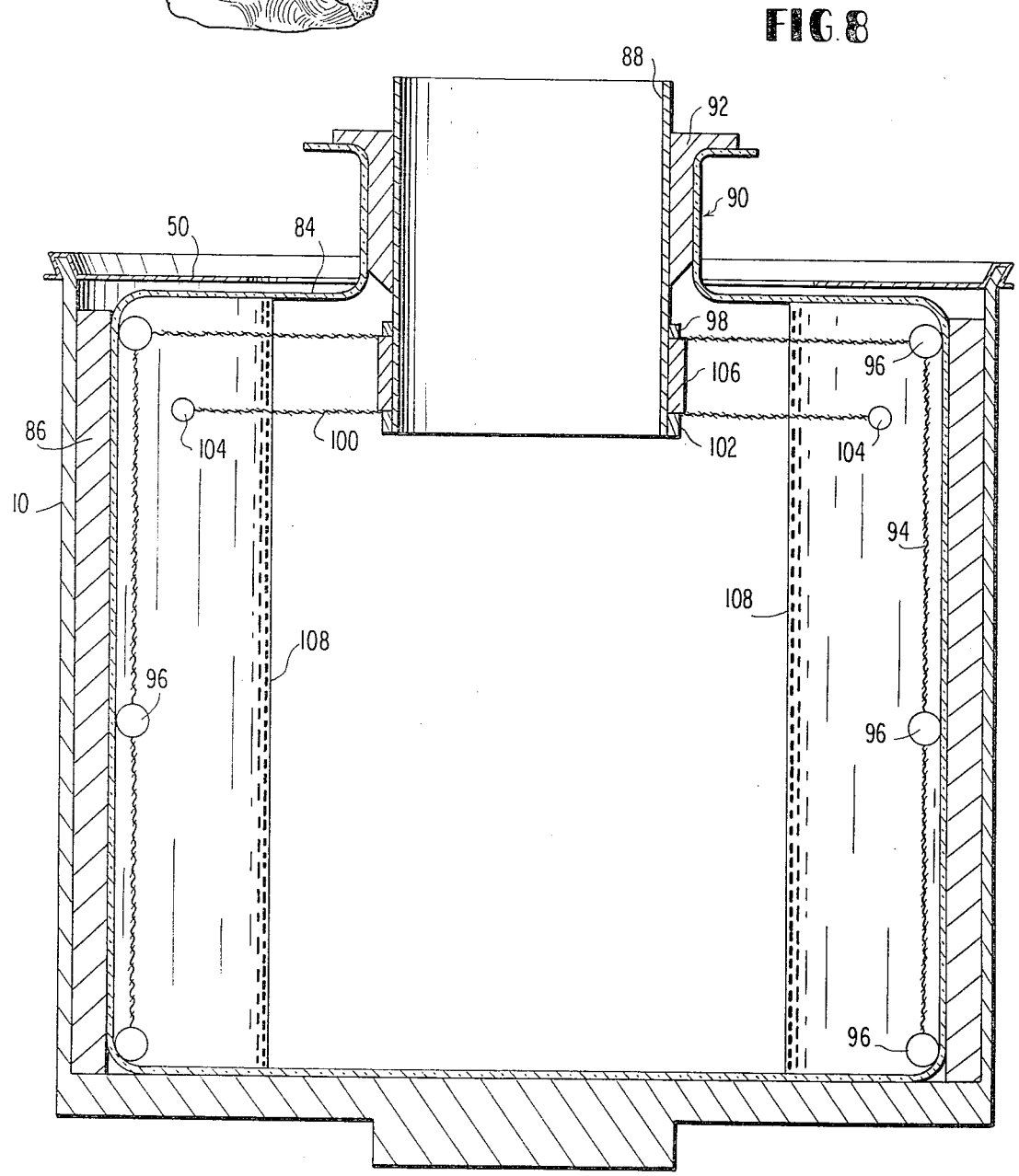
FIG. 8 is a cross-sectional view of a mold tank of this invention including an embodiment for molding a shell within a glass container.

With attention to FIG. 8, the process of this invention may also be utilized to form a wax shell within a glass container wherein the diameter of the shell is greater than the mouth of the container.

In order to utilize the process of this invention to form such a shell within a glass container, the container 84 is mounted within tank 10, and a spacer member 86 which acts as a shim is inserted between the wall of tank 10, and the container of 84. A cylinder 88 is disposed within the mouth 90 of container 84, and a second shim 92 is utilized to wedge the cylinder within mouth 90. A woven fabric, inverted cylinder of tightly woven synthetic fabric 94 is disposed within container 84, and flyweights 96 are disposed therearound as shown in FIG. 8. A collar 98 is used to attach cylinder 94 to cylinder 88. A disc 100 is also mounted on cylinder 88 by collar 102. The disc is also tightly woven synthetic fabric, and flyweights 104 are mounted on the periphery thereof. A spacer member 106 is utilized to separate collars 98 and 102.

Water is then added to the interior of container 84, and as mold tank 10 rotates, the water coats the walls of container 104 to form a molding surface 108.

As wax (not shown) is introduced to the interior of container 84, and coats the molding surface 108, its upward travel is stopped short of the upper wall of container 84, and by the disc 100 with weights 104 attached thereto. As the volume of wax deposit increases, it causes the fabric disc 100 to rise slightly. As the wax cools and shrinks, the flyweights urge the fabric disc to return to the flat posture and also prevents the shell from releasing from the bottom of the container. It may also be necessary to fill the wax shell formed with water to reduce its buoyancy as the rotation of tank 10 is stopped.

The fabric cylinder 94 with the flyweights 96 are intended to remove lighter than water articles from the immediate area of the liquid mold surface 108. The combined weight of the top ring or rings of flyweights 96 serve to urge the closed end of the cylinder to assume a flat posture well clear of the fabric disc 100 so as not to interfere with its function as above described. Therefore, the fabric cylinder 94 could be used to hold a driftwood piece as shown in FIG. 7 while a wax shell is formed. The amount of weights 96 to be attached to cylinder 94 will be determined in part by the buoyancy of the articles, the elastic properties of protruding portions and similar factors.

The device of FIG. 8 may be utilized without the fabric cylinder 94, if for example internal decorative items are not to be used, or if such items are heavier than water such as stones and sea shells. In this instance, the metal disc 56 is not utilized because it is unnecessary in that the shell of wax formed is intended to remain within the glass container 84. In addition, the water tight, flexible lid 50 is utilized without a paper ring 58. The lid 50 serves to retain the glass container 84 within the tank 10 during the molding operation. Because no wax contacts the exterior of the container 84, the paper ring normally utilized with lid 50 is unnecessary.

Because the water used to form molding surface 108 is tap water, it may be desired to use a wetting agent to eliminate water spotting the interior of container 84. A suitable weting agent was found to be commercially available dishwasher powder such as Calgonite.

When the wax shell formed is cooled, the assembly of the cylinder 88, spacer 92, disc 100, and cylinder 94 with associated collars and spacers are removed through the mouth 90. The water within container 84 is then poured out. The wax shell formed may be filled with candle wax and wicked as shown in FIG. 5 to complete the formation of the decorative object within the glass container which achieves the "ship in a bottle" special effect in that the wax article formed is much larger than the diameter of the mouth 90 of the container 84. Finally, if desired, anchoring device may be glued to the inside bottom of the container 84 prior to filling with wax to assist in securing the wax shell formed to the glass container.

Figure 9:
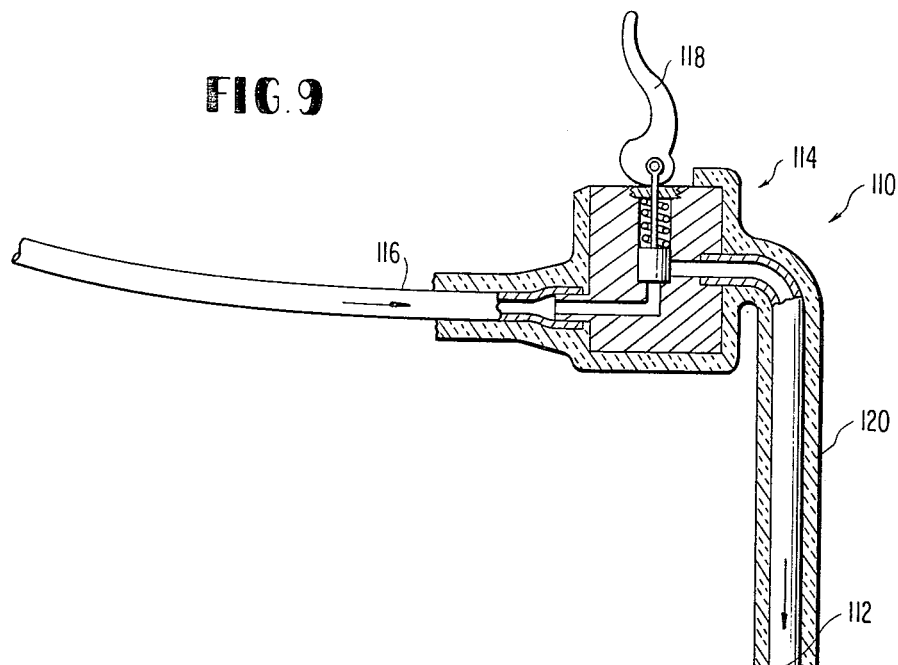
FIG. 9 is a cross-sectional view of a wax injector used to inject molten wax to be molded into the rotating mold of this invention.
Figure 10:
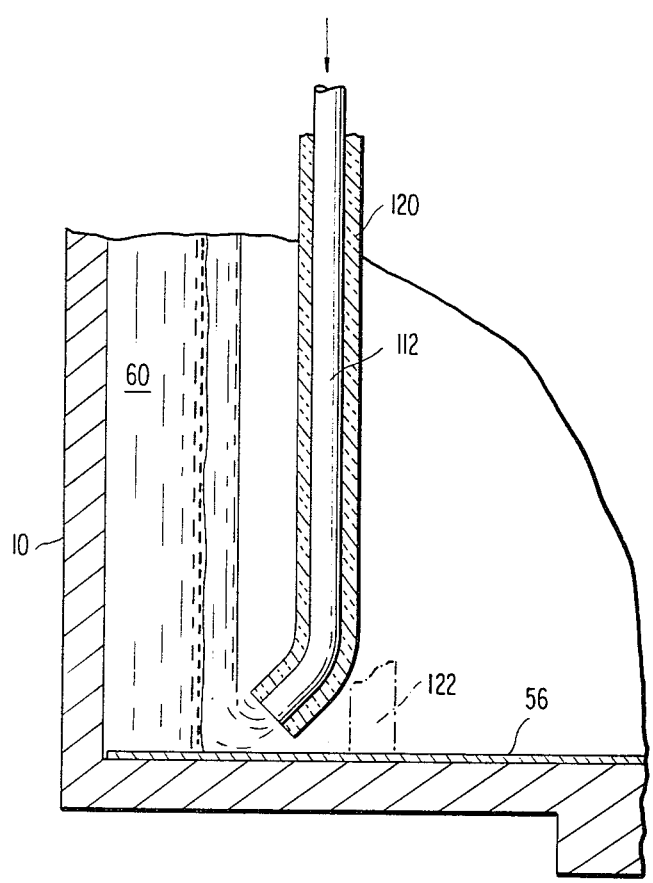
FIG. 10 is a fragmentary cross-sectional view showing molten wax injection with the device of FIG. 9.

With attention to FIGS. 9 and 10, the wax article of this invention may be formed utilizing a procedure wherein the molten wax is merely poured into the rotating container. However, in the alternative, an injector 110 may be utilized to place the wax in the desired quantities within the rotating mold. The injector includes a hollow, tubular nozzle 112 which extends from a spring loaded normally closed valve 114. A flexible hose 116 connects the valve to a supply vessel of molten wax. The valve is opened by depressing level 118 which permits a flow from the tube 116 through nozzle 112. Preferably, the injector 110 is coated with an insulating material coating 120. As shown in FIG. 10, nozzle may be used to place the wax flow in tank 10 adjacent the metal disc 56, where it will be forced against the molding surface 60 by centrifugal force.

After an article is formed as described above, additional water may be added, and a second article formed by injecting wax at for example space 122.

The following are examples of specific shell formulation procedures and results.

EXAMPLE I

In this example, the tank 10 was rotated at a velocity of 725 rpm's. The molding surface was tap water. The material to be molded was 89.9% Chevron 133/135 AMP Candle wax, 6.7% DuPont Elvax 210, and 3.4% Microcrystaline wax (175° F. AMP). The material was hand poured at a temperature of 155° F. through the opening 62 in lid 50 from a height of about 5" above metal disc 52. The rate of pour was approximately 0.231 ozs. per second. A shell was formed then in tank 10 having a diameter of 4", and a height of 4". The molten wax mixture was then molded against tap water having a temperature of about 34° F. and produced an external textural configuration consisting of swirls similar to that shown in FIG. 6.

EXAMPLE II

Utilizing the same wax polymer mixture, tap water, and temperature conditions, the tank was caused to rotate at 725 rpm's. The molten wax mixture was poured again on the metal disc but at a rate of about 0.279 ozs. per second. This pour produced a shell 4" in height having a diameter of aproximately 5¼", which weighed 9½ ozs.

EXAMPLE III

Utilizing the same wax mixture, the temperature thereof was raised to 190° F. Tap water at a temperature of about 34° F. was itilized and the same tank speed of rotation. In this Example, the molten material. was poured from a distance of about 5" onto the metal disc at a rate of approximately 0.1 oz. per second. The shell produced was 4" in height by 4" in diameter and weighed about 6 ozs. Increasing the temperature of the blend, caused a decrease in viscosity and an increase in volume and produced a much more pronounced texture than either Examples I or II above. Swirls having a depth approaching ¼" were noted.

EXAMPLE IV

In this Example, a mixture of 80% Chevron 133/135 AMP Candle wax and 20% DuPont Elvax 210 was used. The material was poured at a temperature of 155° F. Tap water at approximately 34° F. was utilized, and the tank speed was 725 rpm's. The wax mixture was poured onto the metal disc at a rate of about 0.184 ozs. per second. The shell produced had a height of 4", a diameter of 5¾", and a weight of 7¾ ozs. Because the blend had a higher viscosity, it was subjected to greater centrifugal force and produced a swept appearance at the external surface.

EXAMPLE V

In this Example, the same material was utilized as in Example IV. The temperature thereof however was 175° F. This material was hand poured at a rate of about 0.385 ozs. per second onto the rotating metal disc. The shell produced had a height of 4", a diameter of 5½", and a weight of 10 ozs. The textural pattern was relatively featureless as compared with the other Example and with objects produced according to the other Examples above and consisted almost entirely of raised lines not unlike the grooves on a phonograph record, but much larger.

EXAMPLE VI

In this Example, the molten wax material consisted of approximately 89.9% Chevron 133/135 AMP Candle wax, 6.7% DuPont Elvax 210, and 3.4% Microcrystaline wax. Tap water at approximately 36° F. was used for the molding fluid temperature, and the tank was rotated at 975 RPM's. The molten wax material utilized a small amount of dye obtainable, for example, from Pylam Products Co., Inc. of 95-10 218th Street, Queens Village, N.Y., preferably in proportions of 1 oz. dye to about 30 lbs. of wax. The dye utilized was Pyla-wax Bright Yellow, color coded C-647. The molten material containing the dye at approximately 165° F. was poured from approximately 6" above the metal disc at a rate of 0.275 ozs. per second. A shell having a height of 4" and a diameter of 5" was formed having a weight of 7.5 ozs. No adverse effects to the molding process were observed by utilizing the dye.

It should be understood that different colored waxes may be utilized in the same article, and utilization of the injector of FIGS. 9 and 10 would facilitate a layering of different colored waxes within the same shell.

In summary then, a method for producing a cylindrical molded article having a unique exterior texture has been described. The method comprises injecting a molten material such as wax into a cylindrical container which is rotating and has interior walls cooled with a liquid such as water. Centrifugal force then distributes the molten material as a coating over the liquid so that the material solidifies, taking the outer configuration or texture of the liquid surface. The method of this invention then may be utilized to form a candle shell, or a cylindrical container having a unique swirling texture.

The invention may be embodied in other specific forms withot departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by U.S. Letters Patent is:

1. A method for molding a cylindrical object having an outer surface which exhibits a swirling texture comprising:
   providing a cylindrical container having a base and means for rotating said container about its axis;
   injecting a liquid into said container onto the base while rotating said container at a velocity sufficient to coat the inner surface of the walls of said container surrounding the axis of rotation with said liquid by centrifugal force;
   providing molten material to be molded having a specific gravity less than said liquid and injecting a predetermined quantity of said molten material into said container while rotating said container at said velocity so that the centrifugal force of said rotating container will cause said material to climb the inner surface of the liquid coating and cover said surface; permitting said material to cool and solidify against said liquid coating while rotating said container to thereby form said object.

2. The method of claim 1 further comprising injecting said liquid into said container while said container rotates at a velocity sufficient to coat the inner surface of said molded object;

injecting a second predetermined quantity of said molten material into said container while continuing rotation thereof so that said material will cover said liquid coating by centrifugal force;

permitting said material to cool and solidify against said liquid coating to thereby form a second of said objects.

3. The method of claim 1 wherein said container includes a false bottom having an axial hole therethrough said method further comprising successively injecting said liquid and a second predetermined quantity of said molten material into said container and onto the false bottom of said container while rotating said container; and permitting said material to cool and solidify, coating said liquid so that stacked objects will be molded therein.

4. The method of claim 3 further comprising injecting said liquid into said container above and below said false bottom while rotating said container at said velocity so that the liquid coats the inner surface of the objects molded by centrifugal force;

injecting a predetermined quantity of said molten material into said container above and below said false bottom so that said material will cover the inner surface of said liquid coating by centrifugal force;

permitting said material to cool and solidify against said liquid coatings to form said objects stacked within said container.

5. The method of claim 1 wherein said liquid is water.

6. The method of claim 5 wherein said water is maintained at a temperature of about 34° F.

7. The method of claim 1 wherein said material is a mixture of wax and thermoplastic polymers or copolymers.

8. The method of claim 7 wherein said mixture includes microcrystaline wax.

9. The method of claim 7 wherein said mixture further comprises a dye.

10. The method of claim 1 further comprising providing a metal disc; mounting the metal disc within the cylindrical container on the bottom thereof so that molten material injected thereinto will be injected onto said metal disc whereby when the material has cooled and solidified, and cylindrical object formed will rest thereon.

11. The method of claim 1 wherein said cylindrical container further includes a cylinder having an annular lid removably attached thereto whereby the liquid and molten material will be retained within said container as said container rotates.

12. The method of claim 1 further comprising providing a solid decorative object having a maximum lateral dimension less than the internal diameter of said cylindrical container; mounting said object within said cylindrical container adjacent a wall thereof to rotate with said container whereby when said liquid and molten material are successively injected into said rotating container, a cylindrical object will be formed around said solid object when said material cools and solidifies.

13. A method for molding a cylindrical object having an outer surface which exhibits a swirled texture within a cylindrical glass container having a mouth comprising:

providing a cylindrical tank container and means for rotating said tank container about its axis;

providing a cylindrical glass container;

mounting said glass container within said tank container coaxially;

injecting a liquid into said glass container and causing said container to rotate at a velocity sufficient to coat the inner surface of the walls of said container surrounding the axis of rotation with said liquid by centrifugal force;

providing molten material to be molded having a specific gravity less than the liquid and injecting a predetermined quantity of said molten material into said glass container while rotating said container at said velocity so that the centrifugal force of said rotating container will cause said material to climb the inner surface of the liquid coating and cover the surface;

permitting said material to cool and solidify against said liquid coating to thereby form said object;

removing the liquid from said glass container to provide a glass container having a cylindrical object formed therein.

* * * * *